(No Model.) 2 Sheets—Sheet 1.
A. RUGER.
CAKE MACHINE.
No. 248,613. Patented Oct. 25, 1881.
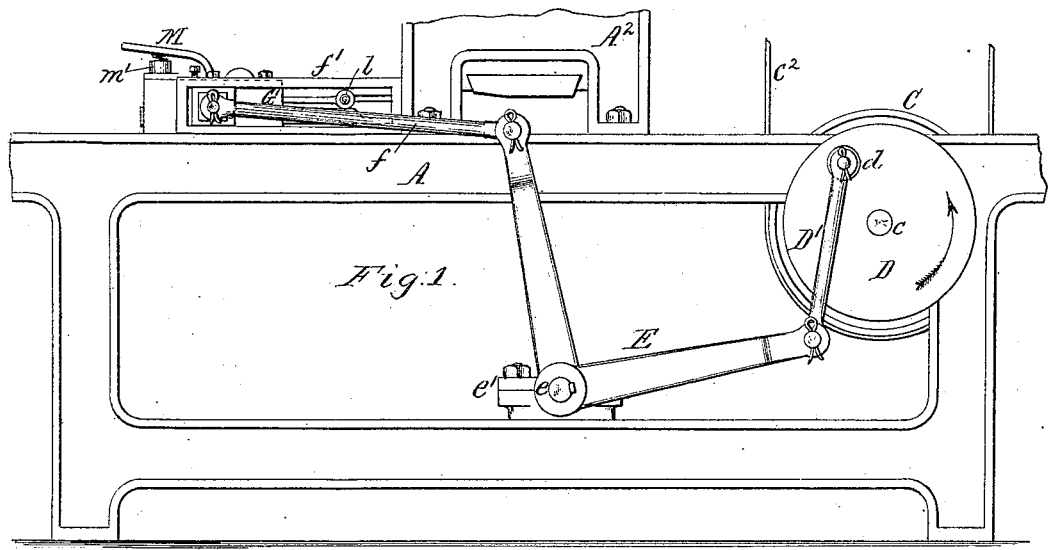
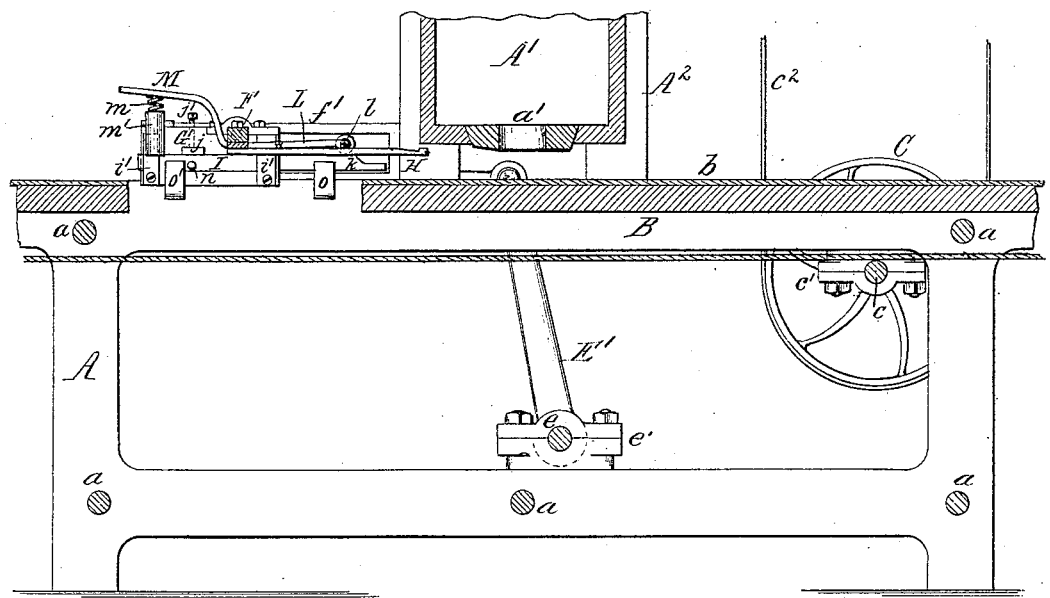
Witnesses:
Chas. J. Buchheit.
Edw. J. Brady.
A. Ruger Inventor
By Wilhelm & Bonner
Attorneys.
N. PETERS. Photo-Lithographer, Washington, D. C.

(No Model.)  2 Sheets—Sheet 2.

A. RUGER.
CAKE MACHINE.

No. 248,613. Patented Oct. 25, 1881.

Witnesses:
Chas. J. Buchheit
Edw. J. Brady

A. Ruger Inventor
By Wilhelm & Bonner
Attorneys.

UNITED STATES PATENT OFFICE.

AUGUSTUS RUGER, OF BUFFALO, NEW YORK, ASSIGNOR TO J. W. RUGER & CO., OF SAME PLACE.

CAKE-MACHINE.

SPECIFICATION forming part of Letters Patent No. 248,613, dated October 25, 1881.

Application filed November 17, 1880. (No model.)

*To all whom it may concern:*

Be it known that I, AUGUSTUS RUGER, of the city of Buffalo, in the county of Erie and State of New York, have invented new and useful Improvements in Cake-Machines, of which the following is a specification, reference being had to the accompanying drawings.

This invention relates to that class of machines which are employed for making cakes of soft dough, and which consist, essentially, of a dough-box, having a plunger which forces the dough through apertures in the bottom of the dough-box, and a cutting mechanism, whereby the dough which protrudes through the apertures of the dough-box is cut up into cakes of the proper thickness, which are delivered upon pans carried under the dough-box by an endless apron. The cutting-wires in machines of this class are carried forward in contact with the bottom of the dough-box during the cutting stroke and dropped after the cut is complete and returned to their former position in a lower plane, so as to clear the dough which protrudes from the apertures of the dough-box, and are then elevated to the plane in which the cutting operation is performed.

The object of my invention is the construction of a simple and effective cutting mechanism having this peculiar motion, and which is otherwise well adapted for the purpose of cutting cakes from soft dough.

My invention consists of the particular construction of the mechanism whereby the required movement is imparted to the cutters, and of the means whereby the cutters are made removable and adjustable, as will be hereinafter fully set forth.

Figure 3:
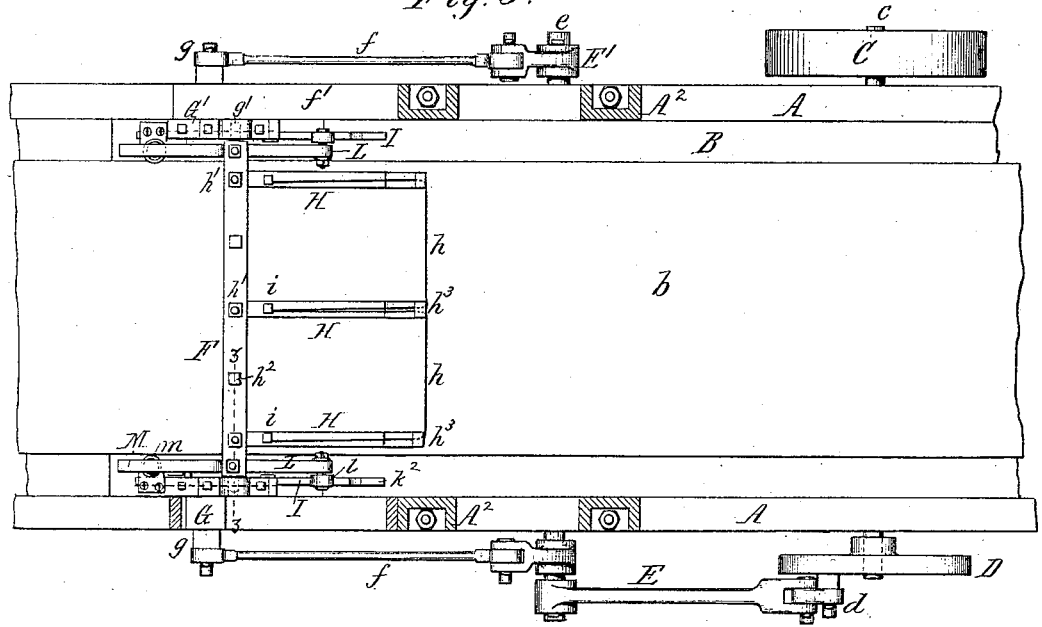
Figure 4:
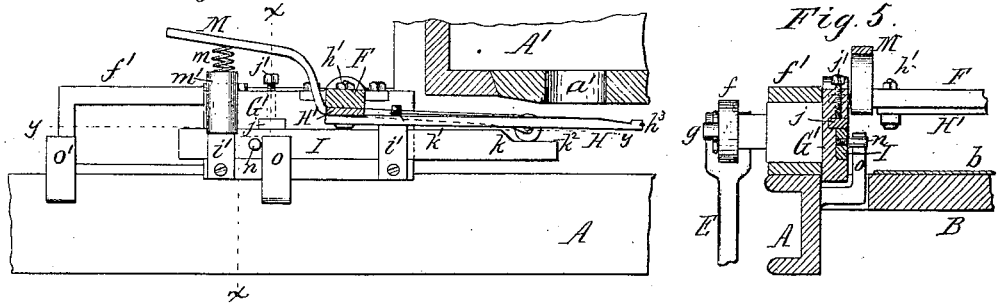
Figure 5:
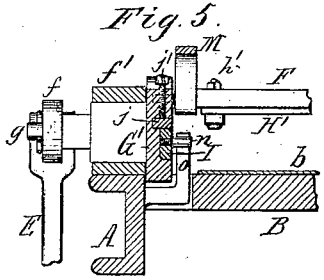
Figure 6:
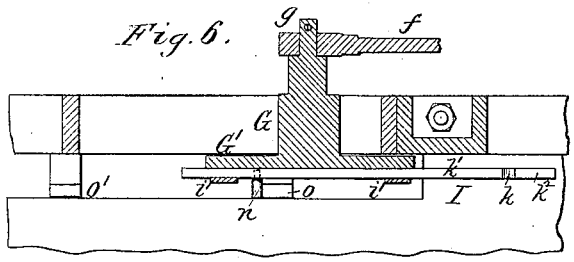
Figure 7:
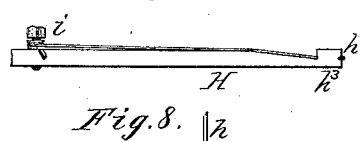
Figure 8:
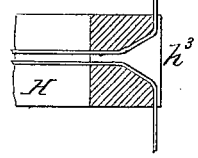
Figure 9:
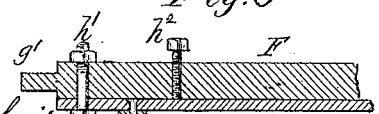

In the accompanying drawings, consisting of two sheets, Figure 1 represents a side elevation of the lower part of a soft-cake machine provided with my improvements. Fig. 2 is a longitudinal sectional elevation, and Fig. 3 a top-plan view, of the same. Fig. 4 is an inside elevation, partly in section, on an enlarged scale, of the parts whereby the cutters are actuated. Fig. 5 is a vertical section in line $x\ x$, Fig. 4. Fig. 6 is a horizontal section in line $y\ y$, Fig. 4. Fig. 7 is a side elevation, on an enlarged scale, of one of the arms to which the cutting-wires are attached. Fig. 8 is a horizontal section through the head of the central arm to which the cutting-wires are attached. Fig. 9 is a vertical section, on an enlarged scale, in line $z\ z$, Fig. 3.

Like letters of reference refer to like parts in the several figures.

A A represent the side frames of the machine, connected by cross-stays $a$.

A' represents the dough-box, supported between standards $A^2$ above the side frames, A, and provided in its bottom with a removable plate, having apertures $a'$, through which the dough is pressed by the follower as it descends in the dough-box.

B represents the horizontal table, secured between the upper portion of the side frames, A, and $b$ is the upper portion of the endless apron which moves over the table B, and upon which the pans are placed for the reception of the cakes.

$c$ represents the driving-shaft, supported in bearings $c'$, and C is the driving-pulley, mounted on one end of the shaft $c$ and receiving motion from an endless belt, $c^2$.

D is a crank-wheel, mounted on the opposite end of the shaft $c$, and D' is a rod connecting the crank-pin $d$ with the lower arm of a bell-crank, E. The latter is mounted on one end of a transverse rock-shaft, $e$, turning in bearings $e'$, and has its upper arm connected by a rod, $f$, with a cross-head, F, moving between horizontal guide-bars $f'$, which are secured to the upper sides of the side frames, A.

E' represents an arm secured to the opposite end of the shaft $e$, and corresponding in length and position with the upper arm of the bell-crank E. The arm E' is connected by a rod, $f$, with the opposite end of the cross-head F.

G represents the cross-head blocks sliding between the guide-bars $f'$, and provided on their outer sides with pins $g$, to which the rods $f$ are connected.

G' is a vertical plate or enlargement formed on the inner side of each cross-head block G, so as to overlap the guide-bars $f'$.

$g'$ is a journal formed at each end of the cross-head F, and resting in a socket in the plate G', so that the cross-head proper, which lies between the blocks G, is capable of a rocking movement on the journals $g'$.

H represents the arms or bars to which the wire cutters $h$ are attached. The bars H are arranged at right angles with the cross-head, and have their rear ends secured to a transverse plate or bar, H', which is removably secured to the under side of the cross-head F, so that the bars H and H', with the wire cutters attached thereto, form a cutter-frame which is readily attached to or detached from the cross-head. The central bar H is arranged between the openings in the bottom plate of the dough-box, so as not to interfere with the delivery of the dough through the same; and upon changing the bottom plate in the dough-box for one having a greater or less number of apertures it frequently becomes necessary to exchange the cutter-frame also for one having the central bar arranged in a manner to correspond with the openings in the bottom plate then in use. This is readily accomplished by the above-described construction. The bar H' is secured to the cross-head F by bolts $h'$, and $h^2$ are set-screws working in threads in the cross-head and bearing against the upper side of the bar H', as shown in Fig. 9, whereby the bar H' can be held at any desired distance from the cross-head and the position of the wire cutters be nicely adjusted with reference to the bottom of the dough-box. The wires $h$ are drawn through openings in the heads $h^3$ of the arms H, as shown in Fig. 8, and run thence backward to screws $i$, tapped into the arms, and to which the wires are secured. Upon turning the screws $i$ in the proper direction the wires are stretched or tightened to any desired degree.

I is a sliding bar, by which the vertical movement of the wire cutters toward and from the bottom of the dough-box is regulated. The bar I is arranged parallel with the guide-bars $f'$, and is guided in a longitudinal recess on the inner side of the plate G', in which recess the bar is held by straps $i'$.

$j$ is a friction-block arranged in a recess of the plate G' on the upper side of the bar I, and $j'$ is a set-screw, whereby the block $j$ is pressed against the bar I. The friction between the block $j$ and the bar I is so regulated that the bar I will move with the cross-head, except when the movement of the bar I is arrested by an obstruction placed in its way. The bar I projects beyond the plate G' toward the dough-box, and has its end provided with an incline, $k$, connecting the upper surface, $k'$, of the bar with its lower end portion, $k^2$.

L is an arm secured to the cross-head F, between each bar I and the cutter-frame, and projecting toward the dough-box.

$l$ is a roller or stud projecting laterally from the arm L and resting on the bar I.

M is an arm secured to the cross-head F, on each side thereof, and projecting outward therefrom or away from the dough-box.

$m$ is a spring seated in a socket, $m'$, secured to the plate G' of each cross-head block, and bearing against the inner side of the arm M. The spring $m$ tends to turn the cutter-head on its pivots in such manner that the cutters would be swung away from the dough-box, thereby keeping the roller $l$ of the arm L in close contact with the bar I.

$n$ is a pin or other projection secured to the inner side of the bar I, and $o$ $o'$ are two stops secured to the side frames, A, at a suitable distance from each other. The stop $o$ arrests the forward movement of the bar I after the cutters have passed by the apertures of the dough-box in their forward or cutting stroke, and the stop $o'$ arrests the backward movement of the bar I shortly before the cross-head completes its backward stroke.

When the parts are in the position shown in Figs. 1 and 2, with the roller $l$ resting on the upper surface, $k'$, of the main portion of the bar I, the wires $h$ are held at the proper height to come in contact with the bottom of the dough-box. The cross-head moves toward the right in Fig. 2, and the wires cut a row of cakes from the dough protruding through the apertures in the bottom of the dough-box. When the cutting operation is completed the stop $n$ on the bar I strikes against the stop $o$, whereby the movement of the bar I is arrested, while the cross-head moves on to the end of its stroke. During this movement of the cross-head the roller $l$ descends over the incline $k$ and stops on the lower portion, $k^2$, of the bar I, whereby the wires are lowered away from the bottom of the dough-box. The cross-head F and the bar I now move backward together, with the cutter-frame in this lower position, until the stop $n$ on the bar I strikes the stop $o'$, whereby the backward movement of the bar I is arrested. The cross-head moves on until it completes its backward stroke, during which movement of the cross-head the roller $l$ rides up over the incline $k$ and stops on the upper portion, $k'$, of the bar I, whereby the cutters are raised to their former position, in which they are ready to cut. In this manner the cutters are brought in contact with the bottom of the dough-box during their forward or cutting stroke, and are then dropped and returned at a lower level, so as not to interfere with the dough which protrudes through the apertures in the bottom of the dough-box, and when they have cleared the dough-box are elevated to their former position.

I claim as my invention—

1. The combination, with the cross-head F and cutters attached thereto, of the sliding bar I, provided with an upper portion, $k'$, and a lower portion, $k^2$, and stops whereby the movement of the sliding bar I is arrested before the cross-head completes its stroke, whereby the cutters attached to the cross-head are alternately supported by the upper and lower surfaces of the bar I, substantially as set forth.

2. The combination, with the cross-head F, pivoted to the plates G', of the sliding bar I, having an upper surface, $k'$, and a lower surface, $k^2$, and provided with stop $n$, and guided in the plate G', friction-block $j$, whereby the bar I is caused to take part in the movement of the cross-head, and stops $o$ $o'$, whereby the movements of the bar I are arrested, substantially as set forth.

3. The combination, with the cross head F, pivoted to the plates G', of the sliding bar I, provided with an upper surface, $k'$, and a lower surface, $k^2$, a friction-block, $j$, whereby the bar I is caused to take part in the movement of the cross-head, an arm, L, attached to the cross-head and provided with a roller or stud, $l$, bearing on the bar I, and an arm, M, and spring $m$, whereby the roller or stud $l$ is pressed against the bar I, substantially as set forth.

4. The combination, with the reciprocating cross-head F, of the longitudinal arms H, to which the cutting-wires $h$ are secured, and the transverse bar H', to which the arms H are attached, and which is, in turn, secured to the cross-head F at both ends, whereby a rigid connection of the cutters with the cross-head is effected and the removal of the cutters rendered possible by simply disconnecting the bar H' from the cross-head, substantially as set forth.

5. The combination, with the cross-head F, of the bar H', carrying the cutter-supporting bars H, bolts $h'$, whereby the bar H' is secured to the cross-head, and set-screws $h^2$, whereby the distance between the cross-head and the bar H is regulated, substantially as set forth.

AUGUSTUS RUGER.

Witnesses:
JNO. J. BONNER,
EDW. J. BRADY.